July 11, 1944.  A. W. HAYDON  2,353,305
ELECTRIC MOTOR AND METHOD OF MAKING SAME
Filed March 14, 1941   2 Sheets-Sheet 2
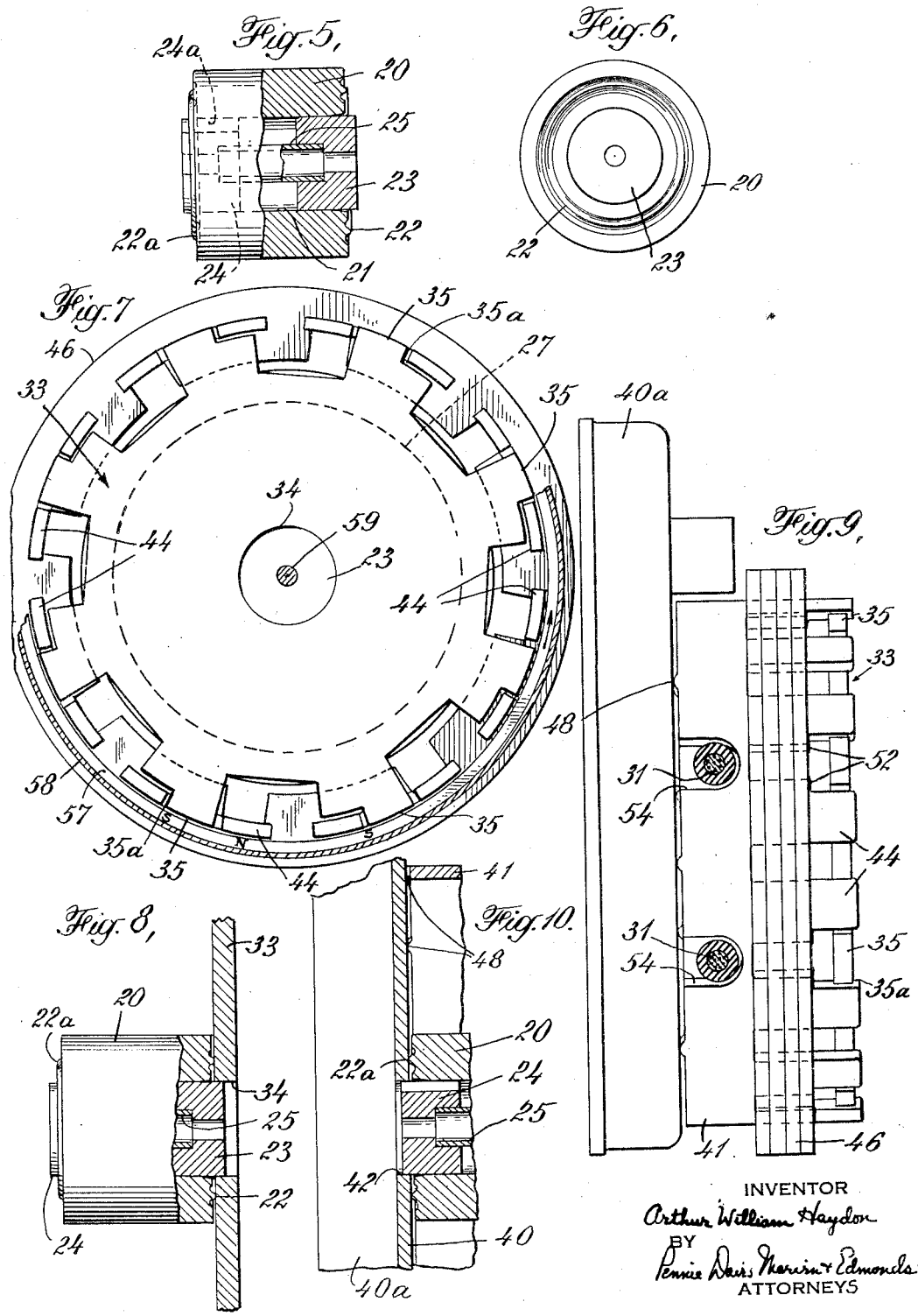
INVENTOR
Arthur William Haydon
BY
Pennie Davis Marvin & Edmonds
ATTORNEYS Patented July 11, 1944

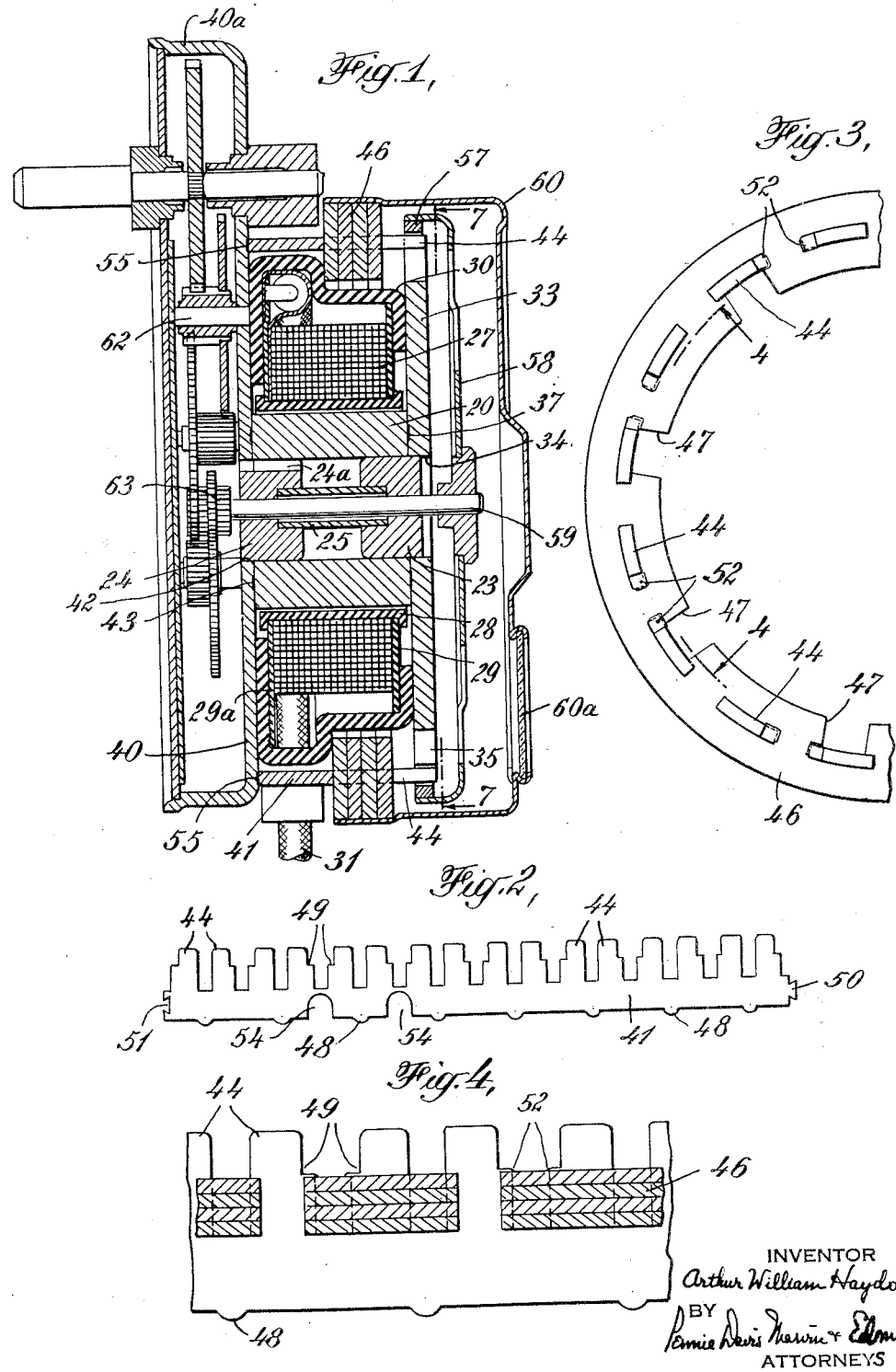

2,353,305

UNITED STATES PATENT OFFICE 2,353,305

ELECTRIC MOTOR AND METHOD OF MAKING SAME

Arthur William Haydon, Marion, Conn.

Application March 14, 1941, Serial No. 383,246

9 Claims. (Cl. 172—278)

This invention relates to electric motors and more particularly to an electric motor of novel construction which is sturdy and compact and affords substantial uniformity of performance when made in quantity production. The new motor is adapted for manufacture at low cost by a novel method which also forms part of the invention.

For illustrative purposes, the motor of my invention will be described in the form of a single phase alternating current motor of the hysteresis type suitable for operating clock mechanisms and other timing devices, although the invention is applicable to other types of motors as well.

Electric motors for timing purposes, as commonly made, comprise a core having a central bore in which bearings are located for a rotatable shaft carrying the rotor armature. A coil is wound around the core and is operable by alternating current to magnetize the core. At the opposite ends of the core are field members, each of which is secured against a shoulder on the core and has an opening through which a reduced end portion of the core projects with a close fit, the end of the core being riveted against the outer face of the field member to hold the member against the shoulder. Each of the field members is provided with pole pieces disposed between pole pieces of the other member so as to form a circular series of poles adjacent the armature and in which adjacent poles are of different polarity at any instant. Generally, one of the field members is cup-shaped and houses the core and its magnetizing coil, the pole pieces of this member being arranged along the free edge of its side wall.

Heretofore, motors of this construction, especially when made in quantity production, have exhibited a lack of uniformity of performance or torque characteristics even with identical designs, one of the principal reasons being the lack of uniformity of the air gap between the pole pieces and the rotor armature. In order to provide uniformity of the air gap in these motors, the armature shaft bearings in the core must be concentric to the reduced ends of the core which locate the field members, the flat field member must be assembled concentrically of the core ends, and the side wall of the field cup must be straight and true, that is, extend parallel to the axis of the bearings and be concentric therewith. Due to manufacturing tolerances, it is practically impossible in commercial production to fulfill these conditions, with the result that the desired uniformity of performance is not obtained.

One feature of the present invention, therefore resides in the provision of a motor of novel construction which affords substantial uniformity of the air gap even when made in quantity production. In accordance with my invention, the bearing means for the armature shaft are arranged in the central core as in present practice, but at one or both ends of the core the field member is located on the bearing means independently of the core by interlocking parts of the bearing means and the field member. To this end, I prefer to insert the bearing means in a central bore in the core so that they project outwardly from at least one end of the core, and provide the field member with a central opening into which the projecting part of the bearing means extends with a close fit. Thus, the field member is centered on or located by the bearing itself so that it is unnecessary to arrange the bearing in concentric relation to the core or to a reduced end of the core to provide a uniform air gap between the pole pieces and the armature. Preferably, the field member is welded to the adjacent end of the core, and with this construction the member is held against lateral movement relative to the bearing both by the interlocking parts of the bearing and field member and by the welding connection.

Another feature of the invention resides in a novel motor construction in which the pole pieces of each of two field members are accurately positioned with respect to the pole pieces of the other member in spite of inaccuracies in the mounting of the field members on the core assembly. In the preferred construction, one of the field members comprises a field plate mounted at one end of the core, and a field ring having pole pieces and secured in an adjusted position to the plate, preferably by welding. By making the field member in two pieces, the field ring may be adjusted relative to its field plate after the latter and the opposing field member have been mounted on the core assembly, so that inaccuracies in mounting these members may be corrected by adjustment of the ring before it is secured to its plate. When the motor is used to drive gearing, I prefer to mount at the end of the core a single plate, such as a gear cup, which serves both to receive and support the studs for the gearing and as the plate of the two-piece field member.

Still another feature of the invention resides in the provision of a novel method by which the motor may be assembled at low cost to provide a substantially uniform air gap between the armature and the pole pieces. According to the preferred method, the field means are first located on the bearing for the armature shaft independently of the core and are then secured to the core as by means of welding. When the two-piece field member is used, the field ring is arranged between its field plate and the opposing field member where it is adjusted to position its pole pieces between adjacent pole pieces of the opposing member, after which the ring is welded or otherwise secured to its field plate.

These and other features of the invention may be better understood by reference to the accompanying drawings, in which Fig. 1 is a longitudinal sectional view of one form of the new motor;

Fig. 2 is a developed view of the field ring shown in Fig. 1, on a reduced scale, prior to assembly of the motor;

Fig. 3 is an end view of part of the field ring assembly of Fig. 1 before it is connected to its field plate;

Fig. 4 is a developed sectional view on the line 4—4 in Fig. 3;

Fig. 5 is a side view, partly in section, of the core assembly shown in Fig. 1, prior to assembly of the motor;

Fig. 6 is an end view of the assembly shown in Fig. 5;

Fig. 7 is a sectional view on the line 7—7 in Fig. 1 with a portion of the rotor element broken away;

Fig. 8 is a longitudinal sectional view of one of the field members in its located position on the core assembly prior to permanent connection thereto;

Fig. 9 is a side view of the motor assembly prior to connection of the field ring to its field plate; and Fig. 10 is a longitudinal sectional view showing the field ring and the core assembly in position adjacent the field plate prior to permanent connection of these parts.

Referring to the drawings, the motor there shown comprises a core 20 having an axial bore 21 extending through the core. At its opposite ends, the core is preferably provided with annuli 22 and 22a, respectively, concentric to the bore and projecting outwardly from the core ends for a purpose to be described presently. A bearing 23 is fitted tightly in one end of the bore 21, the bearing projecting outwardly from the end of the core a substantial distance. Similarly, a bearing 24 is fitted in the opposite end of the bore and projects outwardly from the core a substantial distance, the bearing 24 having a cut-away portion 24a which provides a breather opening for a grease reservoir between the bearings. At their inner ends, the central openings in the bearings are enlarged to receive a sleeve 25.

The core 20 is adapted to be magnetized by a coil 27 wound on a spool 28 through which the core extends the spool being provided with side walls 29 and 29a between which the windings of the coil are confined. An annular covering 30 of insulating material is arranged around the coil and has flanges engaging the outer faces of the side walls of the spool. Lead wires 31 extend from the coil through the covering 30 and are adapted to be connected to a source of alternating current for energizing the coil.

A field member 33 is located at one end of the core and has a central opening 34 into which the projecting end of the bearing 23 is closely fitted. The field member 33 is made of suitable magnetic material preferably of low hysteresis characteristic, such as soft iron, and is provided with radially extending pole pieces 35. The field member is located on the bearing 23 by the interengaging parts of these members and may be secured in its located position by welding the annulus 22 to the adjacent surface of the field member, as shown at 37.

At the opposite end of the core is another field member made of similar material and which, as shown, is a two-piece member comprising a field plate 40 and a field ring 41. The field plate has a central opening 42 in which the projecting end of bearing 24 is closely fitted so as to locate the plate directly on the bearing. Preferably, the field plate is secured in its located position by welding the annulus 22a of the core to the adjacent surface of the plate, as shown at 43. The field ring 41 is provided with pole pieces 44 extending between adjacent pole pieces 35 of the opposing field member.

The pole pieces 35 and 44 may be arranged in any desired manner but I prefer to arrange them generally in the manner disclosed in my Patent No. 1,977,185, granted October 16, 1934. That is, the face of each pole piece 35 is cut away to form a recess 35a extending substantially from the center line of the pole to one side thereof, and the recesses 35a receive alternate pole piecs 44 of the opposing field member. It should be understood that when flux passes through each pole 35, the tip of the pole 44 disposed in the recess 35a of such pole 35 acts as a portion of the magnetic path for this flux. In other words, each of these alternate poles 44, in addition to carrying a distinct flux of its own, acts as a portion of the flux path for the associated pole 35.

The motor may be made self-starting, if desired, by providing suitable shading means for some of the pole pieces. In the illustrated embodiment of my invention, I provide shading means in the form of rings 46 made of copper or similar material of high conductivity. The rings have openings through which the pole pieces 44 extend, but alternate openings are not completely surrounded by a conductive path, slots 47 being provided between them and the adjacent inner edges of the rings. With this arrangement, when the coil 27 is energized with alternating current, the poles 35 and 44 are magnetized in such a way as to produce flux of opposite polarity, which polarity alternates in synchronism with the current in the coil, but since alternate poles 44 are completely surrounded by a highly conductive path the primary flux induced by the coil in each of these alternate poles induces a current in the rings 46 surrounding the pole and this current in turn induces a secondary flux in the pole. In this manner, the effective flux from the alternate, shaded poles 44 is caused to lag behind the flux in the adjacent unshaded poles 44, that is, the poles 44 in the slotted openings in the shading rings.

The field ring assembly may be constructed in various ways, but I have found that it may be made expeditiously at low cost by stamping from a sheet of metal a strip having the pole pieces 44 along one edge, the opposite edge being preferably provided with spaced detents 48 for a purpose to be described presently. Alternate pairs of the poles 44 are recessed at adjacent edges, as shown at 49, and the strip is bent into a ring and its ends connected together, as by means of a dove-tail 50 at one end fitted into a slot 51 in the opposite end. The shading rings 46 are pressed over the pole pieces 44 (Figs. 3 and 4) so that the shoulders formed by the recesses 49 in the poles project a slight distance beyond the outer-most ring 46. The shading rings may then be secured to the field ring by upsetting or staking these shoulders of the poles 44, as shown at 52. It will be apparent that the recesses 49 not only provide shoulders on the poles 44 by which the shading rings are secured to the field ring, but also enlarge the spaces between alternate pairs of poles 44 to receive the poles 35.

In accordance with my preferred method of assembly, the core 20 containing the bearings is placed adjacent the field member 33 so that the bearing 23 locates in the central opening 34 (Fig. 8), and the magnetizing coil 27 on its spool is inserted in the field ring 41, the latter being provided with recesses 54 through which the lead wires 31 extend. The recesses 54, as shown, are each located equidistantly from the opposed shouldered sides of adjacent pole pieces 44, since in this location they seem to have the least effect upon the shaded flux between the poles 44. The spool with the coil and field ring is placed over the core assembly against the field member 33 with the poles 35 disposed in the enlarged spaces between alternate pairs of poles 44 (Fig. 9), and the field plate 40 is placed at the rear end of the core and located by fitting the bearing 24 into the opening 42 (Fig. 10), after which the annulus 22 is welded to field member 33 and the annulus 22a to field plate 40, as in a projection welding machine. The field ring 41 is then adjusted to locate its poles 44 in the desired position between the poles 35, and the detents 48 are welded to the plate 40, as shown at 55.

The pole pieces 35 and 44 act on a suitable armature ring 57 which, as shown, is arranged on a rotor 58 to surround the poles in closely adjacent relation. The armature 57 is preferably made of hardened steel or other magnetic material having a high hysteresis coefficient so that it offers considerable resistance to change in its magnetism. The rotor is secured to a shaft 59 mounted in the bearings 23, 24 and projecting through the core and field plate 40. A cover 60 may be placed over the rotor to shield it and may be secured to the motor in any desired manner as by pressing it over the shading rings 46. The cover 60, as shown, is provided with an opening covered by a sheet of transparent material 60a through which the operation of the rotor may be viewed.

When the motor is used for driving gearing, as, for example, the gear train of a clock, I prefer to employ a field plate 40 in the form of a gear cup having a side wall 40a extending outwardly from the plate, and mount the gear studs 62 directly on the plate, as by forcing them into openings in the plate or in bushings secured to the plate. The rotor shaft may be provided at its rear end with a pinion 63 which drives the gearing on the studs.

In the operation of the motor, when the coil 27 is energized with alternating current, an alternating field is produced by the poles 35 and the alternate, unshaded poles 44, that is, the poles 44 in the slotted openings of the shading rings, the unshaded poles 44 and poles 35 being oppositely polarized by the current and alternating in polarity in synchronism with the current. The field thus produced is a stationary axis field and is therefore incapable of producing torque in the armature 57 when the armature is stationary. The shaded poles 44, however, which are surrounded by a continuous conducting path formed by the shading rings 46, act with the poles 35 and unshaded poles 44 to produce a rotating axis magnetic field. Accordingly, due to the phase shifting effect of the shading rings 46, the instantaneous flux in any of the shaded poles 44 lags substantially in time phase relation behind that in the unshaded pole 44 and leads the flux in the adjacent pole 35. Thus, a rotating magnetic field is produced, the polarity of which rotates about the periphery of the field structure, a given polarity existing first at the unshaded pole 44, an instant later at the shaded pole 44 and an instant later at the pole 35, and so on around the field structure.

The rotating field referred to above reacts with the armature 57 to produce a torque which starts and accelerates the rotor 58. That is, assuming that at a given instant the unshaded pole 44 is so magnetized as to produce a south pole, then at the same instant the pole 35 is so magnetized as to produce a north pole, and the armature 57 is therefore oppositely magnetized, having a north magnetic pole, designated N, in the portion opposite the unshaded pole 44 and a south magnetic pole, designated S, in the portion opposite the pole 35, as shown in Fig. 7. As previously explained, the shaded pole 44, being disposed in a recess 35a in the pole 35, acts as a portion of the pole face of the pole 35. For this reason, the magnetic pole S created in the armature 57 by the flux from pole 35 is substantially coextensive with the peripheral dimension with pole 35 including the portion thereof formed by the tip of the shaded pole 44. Due to the high hysteresis coefficient of the armature 57, the induced polarity at S persists and immediately after the assumed instant, the shaded pole 44, which then has a polarity corresponding to a south magnetic pole, attracts the portion N of the armature and simultaneously repels the portion S thereof, thus producing a torque which turns the rotor in the direction indicated by the arrow. Due to the fact that the secondary flux from the shaded pole 44 acting upon the armature is limited to a low value, this flux is incapable of changing the persisting magnetism of the armature. Accordingly, this secondary flux from the shaded pole 44 merely reacts with the armature polarity S and N created by the unshaded poles 44 and poles 35, but does not disturb the magnetic pattern of the armature.

This repulsion effect of the shaded pole 44 is of greater magnitude than the attractive effect when the motor is stationary or turning at low speeds, but when the armature 57 rotates at higher speeds, the attractive effect becomes dominant. Thus, with the armature 57 stationary, the shaded pole 44 is closer to the portion S of the armature ring which it repels, than to the portion N thereof which it attracts. When the armature attains a higher speed, however, the portion N thereof is closer to the shaded pole 44 than the portion S thereof when the polarity of this pole is south, and the attractive effect becomes dominant, the repulsion effect being then substantially negligible.

If the armature 57 were effected solely by the rotating magnetic field described above, the rotor 58 would accelerate to a speed determined by this field. The torque produced by the attractive effect of the shaded pole 44 on the armature pole N (created by the unshaded pole 44) would become strongly negative upon any tendency of the armature speed to exceed the synchronous speed determined by the angular displacement and phase relation of the flux from the shaded and unshaded poles 44, and, accordingly, the speed of rotor 58 due to the rotating magnetic field would be limited to and determined by the speed ratio of the shaded and unshaded poles 44. This synchronous speed is determined by the angular displacement and time phase displacement in flux of the shaded and unshaded poles 44. The rotor never attains this speed due to the governing effect of the alternating or stationary axis magnetic field produced by the poles 35 and unshaded poles 44.

The alternating field created by the poles 35 and unshaded poles 44 produces a torque in the rotor armature in a manner similar to that described above in connection with the high speed ratio starting poles 44, each field pole 35 attracting the opposite pole induced in the armature 57 by the preceding oppositely polarized unshaded pole 44. This torque differs from that produced by the high speed ratio starting poles in that it is zero at standstill and slightly negative at low speeds, becoming positive only at above approximately one-half synchronous speed.

After the rotor has accelerated to over one-half of the synchronous speed of the alternating field produced by the poles 35 and unshaded poles 44, these poles produce a positive torque which attains in the acceleration of the motor. This torque reaches its maximum positive value at the synchronous speed of these poles, and upon any tendency of the rotor to accelerate to a higher speed, the change of the armature 57 from a lagging to a leading angle with respect to the alternating flux of the governing poles 35 and 44 (unshaded) produces maximum negative torque which prevents further acceleration. This negative torque is of considerably greater magnitude than the positive torque due to the high speed ratio starting poles 44 (shaded and unshaded) at this speed, and accordingly the motor operates at a constant speed which is the synchronous speed of the low speed ratio governing poles 35 and 44 (unshaded). In this manner, the low speed ratio poles act as a governor for limiting the motor speed to a predetermined and constant value.

It will be apparent that the shading coils or rings 46 may be assembled so that the poles 44 shown as shaded are unshaded and vice versa, and, in addition, the field member 33 may be assembled in a reversed position with the recesses 35a on the counter-clockwise sides of the respective pole pieces 35, whereby the direction of rotation of the rotor will be reversed.

While I prefer to construct and arrange the poles 35 and 44 in the manner shown because of the operating advantages referred to, they may be constructed or arranged in any other desired manner with or without shading means. However, regardless of the arrangement of the pole pieces, when the motor is made in quantity production uniform performance may be obtained only by providing a uniform air gap between the circular series of pole pieces and the armature ring 57. With my new construction, a substantially uniform air gap may be obtained because the field members 33 and 40—41 are located not in relation to the core itself but in relation to the bearings 23 and 24 for the armature shaft, by the inter-engaging parts of the bearings and the field members. Each of these bearings is compressed and sized accurately to make its projecting part concentric with the central opening for the armature shaft, and since the field member 33 may be punched in a single operation so as to form its central opening 34 concentric to its poles 35, the latter are concentric with respect to the armature shaft. Additionally, by making the opposing field member in two pieces, as shown, the field ring 41 may be adjusted on its field plate 40 to position the poles 44 in concentric relation to the poles 35 before the final assembly operation of connecting the ring to its plate. In other words, the field member 33 is first located on the adjacent armature bearing so that its poles 35 will be substantially concentric to the armature, and then the field ring 41 is secured to the plate 40 with its pole pieces 44 concentric to the poles 35 and therefore concentric to the armature.

Since the two piece field member 40—41 does not require a drawing operation as in the case of the usual cup-shaped field member, it may be made at relatively low cost. Also, when the motor is used for driving gearing and the field plate 40 is made in the form of a gear cup, as shown, the overall height of the assembly is appreciably reduced due to the elimination of the bottom of the usual field cup and the slight space which is generally provided between the field cup and the gear cup. Additionally, I have found that by assembling the motor in accordance with my new method and providing welded connections as described, the assembly cost of my motor is relatively low and the motor is more rugged.

I claim:

1. For use in an electric motor, a field assembly comprising a field ring having a pole piece which is cut away inwardly from an outer edge to form a shoulder and a recess adjacent the shoulder for receiving part of a coacting pole piece, and shading means having an opening therein through which said pole piece extends, the shoulder of the pole piece being upset to stake the shading means to the field ring.

2. In an electric motor, a pair of field members having pole pieces, selected pairs of pole pieces extending outwardly from one of said members being cut away inwardly from their outer ends at adjacent side edges to provide enlarged spaces between said pairs for receiving pole pieces of the other member and to provide shoulders facing said pole pieces of said last member, and shading means having openings therein through which said cut away pole pieces extend, said shoulders being upset to stake the shading means thereto.

3. In the manufacture of a field member having pole pieces and a shading ring for at least one of the pole pieces, the method which comprises punching an opening in the shading ring for receiving the pole piece with a close fit, cutting away one side of the pole piece inwardly from an outer edge to form a shoulder thereon and a recess for receiving a coacting pole piece, inserting the pole piece through the opening, and staking the shoulder to hold the shading ring in position on the pole piece.

4. In an electric motor, a central core having an opening therein for receiving a shaft bearing element, means for magnetizing the core, a bearing element fitting in the opening in said core, an armature shaft contacting the bearing element and mounted for rotation therein, an armature on the shaft radially outwardly beyond the core, a field member having pole pieces adjacent the armature and having inter-locking engagement with the bearing element for locating the pole pieces relative to the armature, and rigid means connecting the field member to one end of the core in its located position, independently of the bearing element.

5. In an electric motor, a central core having an opening therein for receiving a shaft bearing element, means for magnetizing the core, an armature radially outwardly beyond the core, a bearing element for the armature fitting in the opening in said core, a field member at one end of the core having pole pieces adjacent the armature, said field member being centered on and having direct interlocking engagement with the bearing element to locate the pole pieces relative to the armature, a field plate at the other end of the core, and a field ring having pole pieces and welded to the plate in adjusted position with respect to the first pole pieces.

6. In an electric motor, a central core having an opening therein for receiving a shaft bearing element, means for magnetizing the core, a bearing element tightly fitting in the opening in said core, an armature shaft contacting the bearing element and mounted for rotation therein, an armature on the shaft, a field member having pole pieces adjacent the armature and having interlocking engagement with the bearing element for locating the pole pieces relative to the armature, the armature and the pole pieces of the field member being radially outwardly beyond the core and the armature being radially outwardly beyond the pole pieces of the field member, and rigid means connecting the field member to one end of the core in its located position, independently of the bearing element.

7. In an electric motor, a central core having an opening therein for receiving a shaft bearing element, means for magnetizing the core, an armature, a bearing element for the armature tightly fitting in the opening in said core, a field member at one end of the core having pole pieces adjacent the armature, said field member being centered on and having direct interlocking engagement with the bearing element to locate the pole pieces relative to the armature, a field plate at the other end of the core, and a field ring having pole pieces and welded to the plate in adjusted position with respect to the first pole pieces, the armature and the pole pieces of the field member and the field ring being radially outwardly beyond the core and the armature being at least radially outwardly beyond the pole pieces of at least one of those members.

8. In the manufacture of electric motors having a central magnetizing core having bearing means therein for contacting an armature shaft and supporting the shaft for rotation, and field members at the opposite ends of the core, one of said field members including a field plate and a field ring having pole pieces arranged in a circle, and the other field member having pole pieces arranged in a circle and spaced from the pole pieces of the field ring, the method of assembling and welding the field plate, field ring, and other field member and the core, which includes the steps of positioning the said other field member in such relation to the core that its pole pieces will be in concentric relation with an armature supported by said bearing means, welding the field plate and the other field member to the ends of the core with the field ring loosely disposed between them while said other field member is held in such position relative to the core, adjusting the field ring to position its pole pieces in concentric relation to the pole pieces of the other field member regardless of the position of the field ring with respect to the field plate, and then welding the field ring in its adjusted position to the field plate, whereby the relation of the pole pieces is accurately determined and permanently fixed.

9. In the manufacture of electric motors having a central magnetizing core having bearing means therein for contacting an armature shaft and supporting the shaft for rotation, and field members at the opposite ends of the core, one of said field members including a field plate and a field ring having pole pieces arranged in a circle, and the other field member having pole pieces arranged in a circle and spaced from the pole pieces of the field ring, the method of assembling and welding the field plate, field ring, and other field member and the core, which includes the step of positioning the said other field member with its pole pieces in concentric relation with an armature supported by said bearing means, by providing an accurate central shaft opening in the bearing means concentric with an annular exterior portion of the bearing means, providing a hole in said other field member concentric with its pole pieces, said hole being of such size as to tightly fit said exterior portion of the bearing means and placing said other field member on said exterior portion of the bearing means, welding the field plate and the other field member to the ends of the core with the field ring loosely disposed between them while said other field member is held in such position relative to the core, adjusting the field ring to position its pole pieces in concentric relation to the pole pieces of the other field member regardless of the position of the field ring with respect to the field plate, and then welding the field ring in its adjusted position to the field plate, whereby the relation of the pole pieces is accurately determined and permanently fixed.

ARTHUR WILLIAM HAYDON.